United States Patent [19]

Sandiford

[11] 4,147,211

[45] Apr. 3, 1979

[54] ENHANCED OIL RECOVERY PROCESS UTILIZING A PLURALITY OF WELLS

[75] Inventor: Burton B. Sandiford, Placentia, Calif.

[73] Assignee: Union Oil Company of California, Brea, Calif.

[21] Appl. No.: 855,948

[22] Filed: Nov. 30, 1977

Related U.S. Application Data

[63] Continuation-in-part of Ser. No. 705,623, Jul. 15, 1976, abandoned.

[51] Int. Cl.² .................... E21B 33/138; E21B 43/20
[52] U.S. Cl. .................................. 166/270; 166/268; 166/285; 166/292; 166/294
[58] Field of Search .............. 166/256, 268, 270, 285, 166/292, 294, 305 R

[56] References Cited

U.S. PATENT DOCUMENTS

| | | | |
|---|---|---|---|
| 2,223,804 | 12/1940 | Kennedy | 166/281 |
| 2,786,530 | 3/1957 | Maly | 166/270 X |
| 3,349,844 | 10/1967 | Rhea et al. | 166/294 X |
| 3,386,509 | 6/1968 | Froning | 166/292 |
| 3,486,559 | 12/1969 | Flickinger et al. | 166/292 X |
| 3,491,832 | 1/1970 | Raza | 166/305 R X |
| 3,581,824 | 6/1971 | Hurd | 166/270 |
| 3,799,262 | 3/1974 | Knight | 166/294 X |
| 3,993,133 | 11/1976 | Clampitt | 166/272 |

Primary Examiner—Stephen J. Novosad
Assistant Examiner—George A. Suchfield
Attorney, Agent, or Firm—Richard C. Hartman; Dean Sandford; Gerald L. Floyd

[57] ABSTRACT

A process of treating a plurality of wells involved in an enhanced oil recovery process so that oil and/or gas can be displaced from a reservoir in a more uniform manner comprising treating the formation surrounding and in the immediate vicinity of each well involved in the process with a solution that sets with time to form a plug in the more permeable zones of the reservoir surrounding each well.

13 Claims, 1 Drawing Figure

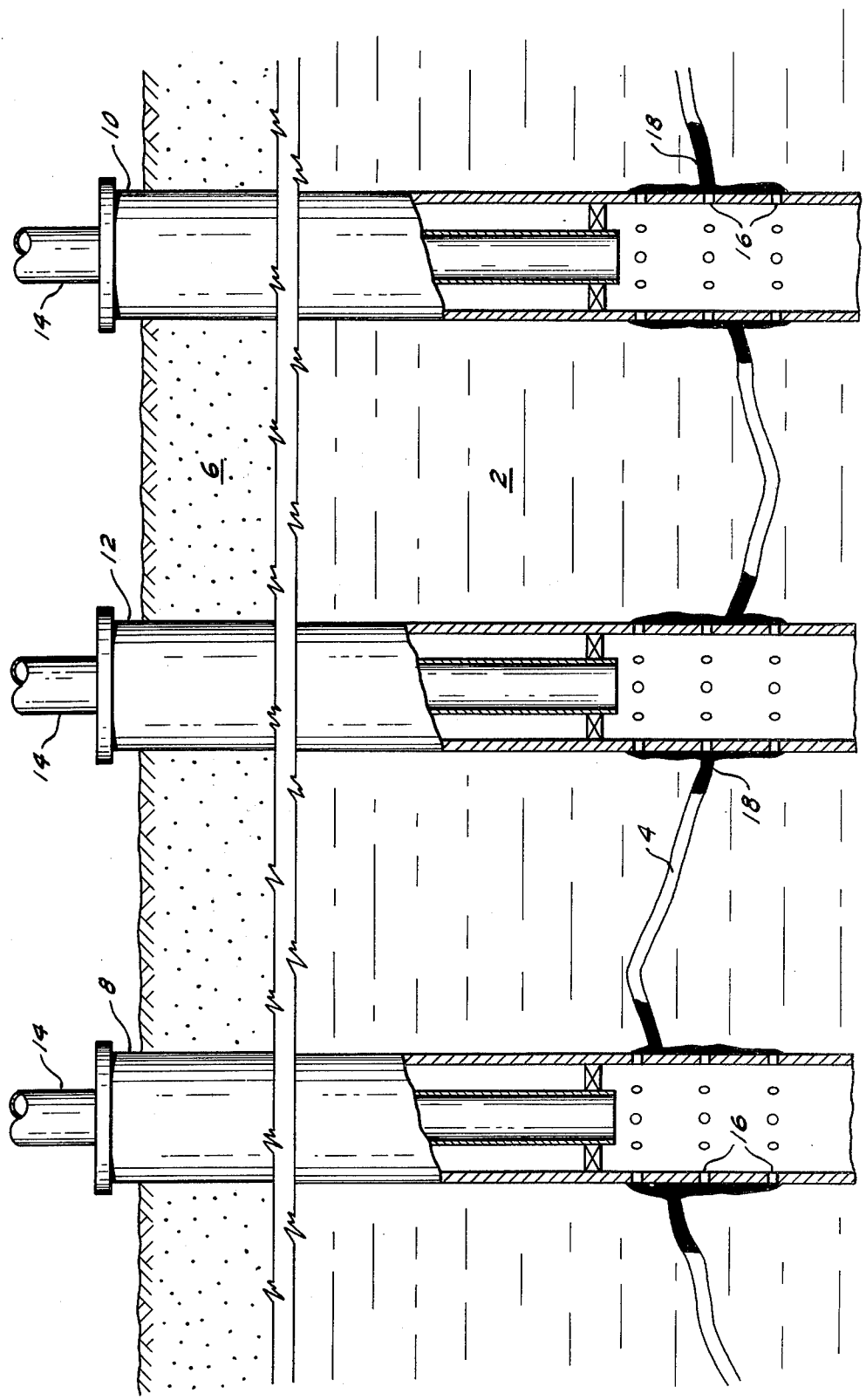

ENHANCED OIL RECOVERY PROCESS UTILIZING A PLURALITY OF WELLS

CROSS-REFERENCE TO RELATED APPLICATION

This is a Continuation-in-Part of copending application, Ser. No. 705,623, filed July 15, 1976, now abandoned.

BACKGROUND OF THE INVENTION (1) Field of the Invention

This invention relates to an enhanced oil recovery process for subterranean reservoirs, especially those which have heterogeneous permeability. More particularly, the invention relates to such a process wherein displacement of oil and/or gas through the reservoir is accomplished in a more uniform manner.

(2) Description of the Prior Art

Most subterranean oil-bearing reservoirs have a heterogeneous permeability at least in some degree. Thus, fluids passing through such reservoirs tend to pass through different portions of the reservoir at different rates. Generally, the higher the permeability of a given portion or zone of a reservoir the higher the flow rate through that portion. If this difference in permeability is sufficiently high, substantially all of the fluid passes through only the more permeable portions of the reservoir. Thus, little fluid moves through the less permeable portions which may constitute the bulk of the reservoir.

In enhanced oil recovery processes, a displacing fluid is injected into a reservoir via one or more injection wells to displace oil through the reservoir to one or more spaced production wells through which oil is produced. One of the principal objectives of such processes has always been to achieve the maximum displacement of reservoir oil by the displacing fluid. In order to accomplish this, it is necessary to establish a uniform flow of fluids through the reservoir.

In conjunction with enhanced oil recovery processes carried out in heterogeneous oil-producing reservoirs, it has been the practice to treat the reservoir at some time during the enhanced oil recovery process by injecting therein via a single injection well or a single production well a solution that enters the more permeable zones of the reservoir surrounding the well and sets after the passage of time to form a plug. U.S. Pat. No. 3,581,824 to Hurd describes an oil recovery process wherein there is injected through an injection system first an aqueous solution containing divalent cations and next an aqueous solution of an ionic polysaccharide thickening agent which sets up upon contacting the divalent cations to plug the more permeable zones of the formation. The polysaccharide solution is followed by a driving fluid. Oil is recovered via a production system. The injection and production systems may each comprise one or more wells and such wells may be located and spaced from one another in any desired pattern. While for simplicity in describing the invention, only one injection well and one production well are shown in the drawing, in practical application of the invention, a plurality of wells may be, and in most cases will be, utilized.

Thus, in the Hurd process it has been the practice to form only a single plug between injection and production wells. If channeling of fluids through the reservoir occurs at some time following placement of such a plug, it is known to inject additional plug-forming solutions in a manner similar to the way in which the first plug was formed. However, due to the wide variations in the character of heterogeneous formations, success of the treatments described above have often been limited. The most permeable channel may be plugged but the fluids are merely diverted into the next most permeable channel or the plug in the most permeable channel is bypassed and uniform flow of fluids through the reservoir is still not achieved.

U.S. Pat. No. 3,386,509 to Froning describes a method of plugging all or substantially all of a high permeability zone between two wells. A settable silicate solution is injected via a first well for part of or the entire distance between the two wells, e.g., to fill from about 50 percent to about 90 percent of the permeable zone. Next, a plug is formed in the zone near the second well by injecting therein either a solution of an activator or a settable mixture. While treatment of high permeability zones in the above-described manner has met with some success, there has been an indication that, in some instances, it is desirable to form plugs of a more limited extent in the high permeability zones between wells. Not only does this result in a savings in the quantity of plug-forming composition required, but also enables placement of a satisfactory plug without undue damage to the production and/or injection potential of a well. Preferably, precautions should be taken to confine the extent of the plugs to the area in the immediate vicinity of each well. Surprisingly, the small plugs formed in the vicinity of each well enables an enhanced oil recovery fluid to displace hydrocarbons from the reservoir in a more uniform manner than can be achieved if the plugs are made larger, i.e., occupy a greater fraction of the high permeability zones.

Accordingly, a principal object of this invention is to provide a process for maximizing the recovery of oil from a heterogeneous reservoir during an enhanced oil recovery method.

A further object of this invention is to provide such a process wherein fluids flow through all zones of the reservoir at a more uniform rate.

A still further object of this invention is to provide such a process wherein channeling of fluids through the reservoir is decreased.

Another object of this invention is to provide such a process wherein the more permeable zones of the reservoir are more effectively plugged.

Still another object of this invention is to form a plug at each end of a channel communicating with a well.

Still another object of this invention is to provide such a process wherein the position of each plug formed is controlled.

Still another object of this invention is to provide such a process wherein the extent of each plug formed is limited and controlled.

Other objects, advantages and features of the invention will become apparent from the following detailed description and drawing.

SUMMARY OF THE INVENTION

A process for increasing the amount of hydrocarbons recovered from a heterogeneous reservoir during an enhanced oil recovery process employing one or more injection wells and one or more production wells penetrating said reservoir wherein, at some time during the carrying out of the enhanced oil recovery process, there is injected into the reservoir via substantially all of the production and injection wells involved in said process, e.g., all the wells communicating with a high permeability zone in the reservoir, a solution or solutions which set up after being positioned in the reservoir to form a plug of relatively limited extent adjacent each such well and therefore decrease the flow of fluids through the more permeable zones of the reservoir surrounding each so-treated well. Preferably the plug formed via all wells treated occupies about 1 to 20 percent by volume of the high permeability zone. Still more preferably, the plugging material injected via any well treated does not extend closer than about 100 feet to any other well in the enhanced oil recovery process.

BRIEF DESCRIPTION OF THE DRAWING

The drawing is a diagramatic elevational view, partly in cross-section, schematically illustrating a typical heterogeneous reservoir following placement of plugging agent according to the process of this invention.

DETAILED DESCRIPTION OF THE INVENTION

The practice of the process of this invention in a subterranean reservoir can be more readily understood by referring to the drawing wherein heterogeneous subterranean oil-and/or gas-containing reservoir 2 containing high permeability zone or channel 4 running therethrough and overlain by overburden 6 is penetrated by injection wells 8 and 10 and production well 12. Even though channel 4 constitutes only a small portion of the total volume of reservoir 2, a high percentage of fluids flowing through reservoir 2 normally passes through high permeability channel 4 with only a low percentage of fluids flowing through the remaining low permeability bulk of reservoir 2. Thus, the presence of channel 4 precludes efficient drainage of the fluids from reservoir 2.

In order to retard the flow of fluids through channel 4, it is necessary to plug the same both at the location at which it is in communication with injection wells 8 and 10 and with production well 12. If only one end of channel 4 is plugged or only a single plug is formed at some point in channel 4 intermediate any two of wells 8, 10 and 12, there is a tendency for fluids flowing through reservoir 2 to bypass the single plug and still flow mainly through channel 4.

Thus, substantially each injection well 8 and 10 and each production well 12 is given a plugging treatment by injecting down tubing 14 of each well and out perforations 16 into reservoir 2 a settable plug-forming liquid composition which sets to form plug 18 extending out into reservoir 2 primarily in channel 4. After plug 18 has formed, an enhanced oil recovery fluid is injected down tubing 14 of injection wells 8 and 10 and formation fluids are produced via production well 12. The enhanced oil recovery fluid breaks through perforations 16 and through the thin shell of plug 18 existing in the relatively low permeability zones of formation 2 but does not displace the more extensive plug 18 in channel 4. Thus, fluids tend to pass through the bulk of formation 2 rather than through channel 4. To further minimize the extend of the thin shell of plug 18 existing in the relatively low permeability zones of reservoir 2, it is preferred to isolate channel 4 from the remainder of reservoir 2 at the well when injecting the plug-forming liquid composition. Such isolation can be achieved in a number of ways, for example, by placing a packer in the annular space between tubing 14 and the casing above channel 4, by positioning a bridge plug in the well below channel 4, by filling the well below channel 4 with sand or a high density aqueous liquid, and the like. The plugging treatments on individual wells 8, 10 and 12 may be carried out at the same time in any desired sequence. Following placement of plugs 18, an enhanced oil recovery process is resumed or carried out using wells 8, 10 and 12. The term "plug" includes a zone having reduced permeability and at least a partial barrier to the flow of fluids through the pores of a reservoir as well as a complete plug through which no fluids can flow. Oftentimes the solid or gel plug formed does not completely seal off the channels in which it is formed but merely reduces the rate of flow of fluids therethrough.

The percentage of wells in a given pattern or field affected by an enhanced recovery method which are given a plugging treatment can vary according to the number of wells involved and the degree of heterogeneity of the reservoir. Generally, for best results, all or substantially all of the wells involved should be given a plugging treatment. In some reservoirs, only a portion of the wells will be in communication with a high permeability zone or channel. In those reservoirs, it is necessary to treat only those wells which are in communication with a channel. The enhanced recovery process can then be carried out using all wells, both treated with a plugging composition and nontreated. Any treated or untreated well which subsequently appears to be affected by a channel can be given a plug-forming treatment at a later time.

Any type of enhanced oil recovery process known in the art may be used in conjunction with the plugging process of this invention. Suitable processes include, for example: (1) waterflood with or without a surface active material or other additive; (2) polymer-thickened water drive; (3) gas drive including hydrocarbon gasses, carbon dioxide, combustion gasses, and the like; (4) steam or hot water thermal recovery processes; (5) in situ combustion processes and the like.

The plug-forming compositions useful in the process of this invention can be any of the compositions well known in the art, such as natural or synthetic polymer plugging compositions, silicate plugging compositions or combinations thereof. In one method of operation, the plug-forming composition is injected into the reservoir as two separate reactive compositions which contact each other, mix and react in the reservoir. Alternatively, there can be injected a single time-setting composition containing an aqueous solution of at least two fluid reactive components which composition sets after a predetermined length of time to form a plug.

In using a polymer plugging composition, a number of water-soluble polymers may be used. Exemplary water-soluble polymeric materials are relatively high molecular weight acrylic acid-acrylamide copolymers, polyacrylamides, partially hydrolyzed polyacrylamides, polyalkyleneoxides, carboxyalkylcelluloses, hydroxyethylcelluloses, alkali metal lignosulfonates and heteropolysaccharides obtained by the fermentation of starch-derived sugar.

Many of the water-soluble polymers useful in the practice of this invention are characterized by a viscosity of at least 3 centipoises for a 0.1 percent by weight solution thereof in aqueous 3 percent by weight sodium chloride solution at 25° C. as determined with a Brookfield viscometer equipped with a UL adapter and operated at a speed of 6 rpm. However, it is to be recognized that other of the water-soluble polymers, such as certain polyacrylamides and polyalkyleneoxides, are effective in reducing the mobility of water in porous media, yet have little or only slight effect upon the viscosity of water or brine.

The polyacrylamide and partially hydrolyzed polyacrylamide which can be used in this invention include the commercially available, water-soluble, high molecular weight polymers having molecular weights in the range of above about $0.2 \times 10^6$, preferably from $0.5 \times 10^6$ to $40 \times 10^6$ and more preferably from $3 \times 10^6$ to $10 \times 10^6$. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide polymer is accomplished by reacting the same with sufficient aqueous alkali, e.g., sodium hydroxide, to hydrolyze the desired number of amide groups present in the polymer molecule. The resulting products consist of a long hydrocarbon chain, with some carbon atoms bearing either amide or carboxyl groups. Copolymerization of acrylic acid and acrylamide according to well known procedures produces acrylic acid-acrylamide copolymers. The term "hydrolyzed polyacrylamide", as employed herein, is inclusive of the modified polymers wherein the carboxyl groups are in the acid form and also of such polymers wherein the carboxyl groups are in the salt form, provided that the salts are water-soluble. Alkali metals and ammonium salts are preferred. A number of polyacrylamides and partially hydrolyzed acrylamide polymers and acrylic acid-acrylamide copolymers suitable for use in this invention are commercially available, for example, WC-500 polymer marketed by Calgon Corporation of Pittsburgh, Pa., Pusher 700 polymer marketed by The Dow Chemical Company of Midland, Mich., and Q-41-F polymer marketed by Nalco Chemical Company of Oak Brook, Ill.

Especially useful in the practice of this invention are the at least partially cationic polyacrylamides, the at least partially anionic polyacrylamides and mixtures thereof. A partially cationic polyacrylamide is a nonionic polyacrylamide which contains a cationic comonomer, such as an alkylene polyamine, a quaternary ammonium chloride or amine hydrochloride, for example, trimethyl octyl ammonium chloride, trimethyl stearyl ammonium chloride, oleyl trimethyl ammonium chloride, oleyl amine diethylamine hydrochloride and dimethylaminopropylamine. A partially anionic polyacrylamide can be a nonionic polyacrylamide which has been partially hydrolyzed to convert some of the acrylamide groups to acrylic groups, to alkali metal salts of which are anionic. Introducing sulfate or sulfonate groups into the polyacrylamide molecule also imparts an anionic character to the moelcule. WD-120 copolymer is a 20 percent by weight cationic, 80 percent nonionic copolymer marketed by Betz Laboratories, Inc. of Trevose, Pa. WD-160 polymer and Hi Vis polymer are 40 percent anionic, 60 percent nonionic polyacrylamides which have been partially hydrolyzed to the extent of 35 percent. These polymers are also marketed by Betz Laboratories, Inc.

The operable polyalkeneoxides have molecular weights in the range of from about $10^5$ to about $10^8$, preferably from $10^6$ to $10^7$ and most preferably from $3 \times 10^6$ to $10 \times 10^6$. By "polyalkeneoxide" is meant herein any of the polymeric water-soluble resins prepared by homopolymerization of a single alkene oxide, for example ethylene oxide, propylene oxide or butylene oxide. It is preferred to employ the homopolymer of polyethylene oxide. This product is marketed by Union Carbide Chemicals Company under the trademark "Polyox". Mixed polyalkeneoxides, made by heteropolymerization of more than one alkene oxide in either a random or block polymerization, may also be employed.

Also suitable for use in this invention are the alkali metal or ammonium salts of a carboxyalkylcellulose, such as carboxymethylcellulose. Carboxymethylcellulose may be represented by the formula:

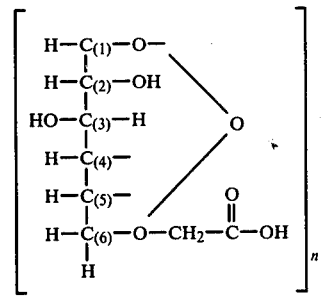

where n is a whole number greater than one, and the carboxymethyl anhydroglucose units are connected together by oxygen bridges between carbon atom (1) of one unit and carbon atom (4) of another unit. A salt of carboxymethylcellulose is carboxymethylcellulose wherein the H at the end of the carboxymethyl group in one or more of the carboxymethyl and anhydroglucose units is replaced by a cation. In any molecule or group of molecules of carboxymethylcellulose, each anhydroglucose unit need not necessarily contain a carboxymethyl group although one or more anhydroglucose units may possibly contain up to three carboxymethyl groups, the additional carboxymethyl groups being substitted for the H's of the OH groups on carbon atoms (2) and (3). As used herein, the term "carboxymethylcellulose" is defined as any carboxymethylcellulose having a degree of substitution less than one wherein the number of anhydroglucose units exceeds the number of carboxymethyl groups. Commercial grades of carboxymethylcellulose have a degree of substitution ordinarily between 0.5 and 0.9.

Hydroxyethylcellulose can be prepared from shredded wood pulp which has been soaked in 30 weight percent sodium hydroxide for about 20 hours. The resultant alkali cellulose is reacted with either ethylene oxide or ethylene chlorohydrin until a sufficient number of ethylene groups per glucose unit have been combined. The water-soluble form of hydroxyethylcellulose useful in this invention has a substitution (hydroxyethyl groups per glucose unit) greater than about 0.5, and preferably from 1.0 to 2.0. This is in contrast to the alkalisoluble form of hydroxyethylcellulose which has a substitution less than about 0.3. Generally, about 4 to 5 hours are required at about 40° C. for complete reaction of the alkali cellulose with the ethylene compound to produce a water-soluble hydroxyethylcellulose. The product is available commercially as either a solid fibrous material or in the form of aqueous solutions having up to about 10 weight percent hydroxyethylcellulose and viscosity ranges from about 10 to 1200 centipoises. A very high molecular weight compound suitable for use in this invention is marketed by Hercules Inc. as Natrosol 250. Other suitable products are marketed, as under the trademark Cellosize, marketed by the Union Carbide Chemicals Company.

The heteropolysaccharides which may be used in carrying out the present invention are ionic polysaccharides produced by fermentation of carbohydrates by bacteria of the genus Xanthomonas. Examples of such heteropolysaccharides are those produced by *Xanthomonas campestris, Xanthomonas begonia, Xanthomonas phaseoli, Xanthomonas hederae, Xanthomonas incanae, Xanthomonas carotae* and *Xanthomonas translucens*. Of these, ionic polysaccharide B-1459 is preferred. The polysaccharide B-1459 is prepared by culturing the bacterium *Xanthomonas campestris* NRRL B-1459, U.S. Department of Agriculture, on a well-aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the trademark Kelzan MF marketed by Kelco Company of San Diego, Calif. Production of this heteropolysaccharide is well described in Smiley, K. L. "Microbiol Polysaccharides—A Review". *Food Technology* 20, 9:112–116 (1966) and Moraine, R. A., Rogovin, S. P. and Smiley, K. L. "Kinetics of Polysaccharide B-1459 Synthesis", *J. Fermentation Technology* 44, 311–312 (1966).

The selected water-soluble polymer is admixed with water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the formation into which they are to be injected is water-sensitive or where fresh water is not available. In most instances, the mobility of the water can be reduced to the desired level by the addition of about 0.001 to about 1 weight percent of the polymer, and satisfactory results can often be obtained by the addition of 0.05 to 0.15 weight percent of polymer.

The material which reacts with the polymer within the formation to produce a polymer-containing plug can be any one or a mixture of a number of materials. Generally such materials are those which at least partially cross-link the polymer to form a gelatinous precipitate. Suitable cross-linking agents include mixtures of a compound of a multivalent metal and a reducing agent, or a low molecular weight water-soluble aldehyde, or a colloidal hydroxide of a multivalent cation. Mixtures of the various types of cross-linking agents may also be used.

Where the cross-linking agent is a mixture of a compound of a multivalent metal and a reducing agent, suitable multivalent metal compounds are water-soluble compounds of polyvalent metals wherein the metal is present in a valence state which is capable of being reduced to a lower valence state. Examples of such compounds include potassium permanganate, sodium permanganate, ammonium chromate, ammonium dichromate, the alkali metal chromates, the alkali metal dichromates and chromium trioxide. Sodium dichromate and potassium dichromate are preferred because of their low cost and ready availability. The hexavalent chromium in the chromium compounds is reduced in situ to trivalent chromium by suitable reducing agents, as discussed hereinafter. In the permanganate compounds, the manganese is similarly reduced from +7 valence to +4 valence as in $MnO_2$. The amount of the starting multivalent metal-containing compound used will usually be an amount sufficient to provide at least about $3 \times 10^{-6}$, preferably at least $3 \times 10^{-5}$, gram atoms of said metal capable of being reduced per gram of polymer. Preferably, the amount of said metal capable of being reduced which is used will not exceed $4 \times 10^{-3}$, more preferably $2 \times 10^{-3}$, gram atoms of said metal per gram of polymer. Generally about 0.05 to 60, preferably 0.5 to 30, weight percent multivalent metal-containing compound based on the amount of polymer used will provide the requisite amount of multivalent metal.

Suitable reducing agents which can be used in this combination include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, hydrogen sulfide and others. Nonsulfur-containing reducing agents which may be used include hydroquinone, ferrous chloride, p-hydrazinobenzoic acid, hydrazine phosphite, hydrazine dichloride and the like. The most preferred reducing agents are sodium hydrosulfite and potassium hydrosulfite. The amount of reducing agent used will generally be within the range of from 0.1 to at least 150 weight percent of the stoichiometric amount required to reduce the metal in the starting multivalent state to the lower valence state, e.g., +6 Cr to +3 Cr.

When a low molecular weight water-soluble aldehyde is used as the cross-linking agent, formaldehyde, paraformaldehyde or glyoxal may be used as well as derivatives thereof, such as hexamethylenetetramine, which can produce formaldehyde or glyoxal in an acidic solution. Aldehydes will cross-link the water-soluble polymers at a pH of about 3 or lower. Generally, the more acid the pH, the more rapid the cross-linking. The amount of the aldehyde cross-linking agent can be varied from about 0.01 percent to about 50 percent based on the weight of the polymer present in the aqueous solution.

When the cross-linking agent is a colloidal hydroxide of a polyvalent cation, there is utilized a polyvalent ion, such as aluminum, chromium, copper, iron, cadmium, cobalt, manganese, nickel, tin or zinc in the form of water-soluble salts, such as sulfates, chlorides and the like at a pH sufficiently low to retain the ions in solution. The formation contacted by the treating solution acts as a buffer in that it gradually raises the pH, thereby precipitating the hydroxide of the above-mentioned ions which react with the polymer. Generally an aqueous solution containing from 0.005 to 5.0 weight percent of inorganic ion based on the weight of polymer can be used.

In using a silicate plugging composition, there is employed an aqueous liquid mixture of two or more reactive chemical agents which react in the formation to form a precipitate or gel. One reactive chemical agent is an alkali metal silicate. The other reactive chemical agent is a gelling agent for the alkali metal silicate. Sodium silicate is the most commonly used alkali metal silicate. The gelling agent can be an acid or an acid-forming compound, a water-soluble ammonium salt, a lower aldehyde, an aluminum salt or an alkali metal aluminate. Exemplary gelling agents are sulfuric acid, hydrochloric acid, ammonium sulfate, formaldehyde, aluminum sulfate and sodium aluminate. The silicate reacts in the presence of the gelling agent to form a silica or silica alumina gel. It is well known that the gelling of sodium silicate in the presence of these gelling agents is delayed, i.e., gelling occurs at some time after the silicate and gelling agent are admixed. It is preferred that the conditions be selected in accordance with known techniques to delay gelling of the sodium silicate for a period sufficient to permit its injection into the reservoir immediately adjacent to the well, but yet not for a period that would unduly prevent continuance of normal well operations. Thus, in most cases, it is preferred that the conditions be selected so that gelling is delayed for about two hours, and is subsequently completed within about 24 hours. Alternatively, the reactive chemical agents can be injected in separate solutions with mixing occurring in the reservoir.

The concentration of alkali metal silicate in the plugging solution can vary over a wide range, e.g., from about 1 to 30 weight percent. However, weaker plugs are formed at the more dilute concentrations and costs are often excessive at higher concentrations. Thus, it is preferred that the alkali metal silicate concentration of the plugging solution injected into the formation be between about 3 and 15 weight percent and preferably between about 3 and 10 weight percent. The ratio of silica to alkali metal oxide in the silicate can also vary within limits from about 1.5 to 1 to about 4 to 1 by weight. Preferably, however, the ratio should be from about 3 to 1 to about 3.5 to 1, i.e., if it is preferred that the alkali metal silicate solution contain 3 to 3.5 parts by weight of silica per part of alkali metal oxide.

The concentration of gelling agent employed can vary over a wide range depending on such variables as the particular gelling agent used, the pH of the system and the gel time desired. In general, an aqueous solution containing from about 1 part by weight gelling agent per each part by weight alkali metal silicate used is satisfactory.

The amount of polymer solution required to obtain the desired treatment will vary from well to well and can best be determined from a knowledge of the reservoir characteristics obtained from well logs, core analysis, injection profiles and tracer studies. Nevertheless, it is found that satisfactory results can often be obtained by the injection of about 1 to 200 barrels of aqueous polymer solution per vertical foot of the more permeable zones of the reservoir to be treated, i.e., about 1 to 200 barrels per vertical foot of channel. The material which reacts with the polymer within the formation to produce a polymer-containing plug can be admixed with the aqueous polymer solution at the surface, preferably shortly before the solution is injected into the reservoir, or it may be injected in an aqueous solution as a separate slug either before or after the injection of the aqueous polymer solution. In the case of the separate injection of the polymer solution and the cross-linking agent solution, mixing of the two reactants occurs after the two solutions are in the reservoir. When the polymer solution and the cross-linking agent solutions are injected separately, it is sometimes advantageous to utilize a slug of an inert spacer liquid, such as fresh water or brine, which is injected between the two slugs of reactive chemicals to keep the reactive chemicals from coming into contact until they are out in the reservoir where the spacer slug tends to dissipate. Generally a spacer slug of about 1 to 10 barrels per vertical foot of channel to be treated is adequate; however, the exact volume of water injected in this step is not usually critical. A similar inert spacer slug of similar size can be used to separate the composition or compositions injected to form the polymer-containing plug from the composition subsequently injected to form the silicate-containing slug.

If a silicate plugging material is employed, the amount of the solution of alkali metal silicate and gelling agent required can also vary over a wide range. In general, there is used about 1 to 200 barrels of aqueous solution of alkali metal silicate and gelling agent per vertical foot of channel to be treated. The alkali metal silicate and gelling agent can be mixed into the same aqueous solution at the surface and injected into the well as a single slug or they can be injected as separate aqueous solutions in any desired order. When the two components are injected in separate solutions, it is preferred that the first injected slug contain from about 0.001 to 1 weight percent of one of the above-mentioned water-soluble or water dispersible polymers as a thickening agent. This thickened solution then tends to move through the formation at a slower rate than the second injected slug and mixing of the two slugs in the formation is enhanced.

When the injected plug-forming composition first enters a well, its position is relatively easy to control and it primarily occupies the high permeability zones. As the composition moves through the reservoir from the well through which it is injected toward the other wells which are in communication with the high permeability zones, its position becomes increasingly difficult to control. Generally, the greater the volume of plug-forming composition injected the greater will be the proportion of the high permeability zones occupied by the composition. However, at the same time, the greater the volume of plug-forming composition injected the greater will be the penetration of the less permeable oil-containing zones by the composition. Excessive penetration of the less permeable zones is undesirable because it is through these zones that the subsequently injected enhanced oil recovery fluid must flow. Thus, it is desirable to plug the high permeability zones by injecting a minimum of plug-forming composition. If this relatively small plug is subsequently bypassed by the enhanced oil recovery liquid resulting in a high rate of flow of injected fluid through the unplugged high permeability zones, the plugging process of this invention can be repeated. Formation of two separate relatively small plugs via one well as described above results in less penetration of the low permeability zones of the reservoir than would formation of a single relatively large plug.

It is preferred that the plug formed via all wells treated occupy only a limited extent of the high permeability zone, for example, about 1 to 20 percent by volume of the high permeability zones. In order to minimize the undesirable penetration of the plugging material into the less permeable zones of a reservoir, it is further preferred that the plugging material injected via any well treated does not extend closer than about 100 feet to any other well in the reservoir, especially those wells which are in communication with the high permeability zone.

After the treatment of this invention wherein a plug is formed in substantially each well penetrating a heterogeneous reservoir, the treated well can be returned to its intended use, such as for production of oil or for injection of enhanced oil recovery fluids. During this subsequent passage of fluids through the reservoir during the production or injection, the fluids tend to pass through the less permeable portions of the reservoir rather than through the more permeable portions of the reservoir which are occupied by the plugging materials.

While the reasons that the particular treatment of this invention results in improved oil recovery during enhanced oil recovery operations are largely unknown and speculative, it is believed that one contributing factor is as follows. When a high permeability zone or channel communicates both with an injection well and a production well, placement of a plug near each end of the channel, i.e., in the channel adjacent both the injection well and the production well results in a greater proportion of the fluid flowing through the reservoir passing through the less permeable portions of the reservoirs. Also bypassing of two spaced plugs appears to occur with far less frequency than if only a single plug is present in the channel.

The invention is further described by the following example which is illustrative of a specific mode of practicing the invention and is not intended as limiting the scope of the invention as defined by the appended claims.

EXAMPLE

An enhanced oil recovery process is carried out in a reservoir known to have heterogeneous permeability. There are 10 production wells and 5 injection wells drilled in the reservoir. The horizontal distance between the wells varies from about 900 to 2,000 feet. Tracer tests are conducted in which a brine containing a radioactive tracer material is injected via each injection well and each production well is observed for arrival of the radioactive material. These tests indicate that 9 of the production wells and 4 of the injection wells are in communication with a high permeability zone in the reservoir having an average vertical extent of about 4 feet. Each of these 9 production wells and 4 injection wells is given a plug-forming treatment by sequentially injecting into the reservoir surrounding each well:

(a) 5 barrels of an aqueous solution containing 7 percent by weight ammonium sulfate gelling agent and 0.6 percent by weight hydroxyethyl cellulose mobility reducing agent, (b) 2 barrels fresh water inert spacer, (c) simutaneously 12.5 barrels of an aqueous solution containing 7.5 percent by volume N-grade sodium silicate* and 12.5 barrels of an aqueous solution containing 3.6 percent by weight ammonium sulfate gelling agent, and L6 *N-grade sodium silicate — an aqueous commercial sodium silicate containing about 37.6 percent by weight sodium silicate and having a silica to sodium oxide ($SiO_2/Na_2O$) ratio of 3.22, marketed by Philadelphia Quartz Company.

(d) 8 barrels fresh water inert spacer.

Each well is shut in for 24 hours to allow time for the plug to form. The enhanced oil recovery process is then resumed by injecting water as a drive fluid via each of the 5 injections wells and producing each of the 10 production wells. Increased injection pressure is noted at each of the 4 treated injection wells indicating that the injected flooding medium is being forced through less permeable portions of the reservoir. Increased oil production and decreased water production is noted at each of the 9 treated production wells indicating increased flow of reservoir oil through the less permeable portions of the reservoir.

Various embodiments and modifications of this invention have been described in the foregoing specification, and further modifications will be apparent to those skilled in the art. Such modifications are included within the scope of this invention as defined by the following claims.

Having now described my invention, I claim:

1. In the process of carrying out an enhanced oil recovery process in a subterranean oil-bearing reservoir of heterogeneous permeability having a high permeability zone wherein a drive fluid is injected into said reservoir via one or more injection wells and oil and/or gas is produced via one or more production wells, the improvement which comprises forming a plug in the reservoir adjacent each injection well which is in communication with the high permeability zone and in the reservoir adjacent each production well which is in communication with the high permeability zone, the plug formed occupying about 1 to 20 percent by volume of the high permeability zone, by injecting into the reservoir via each injection well and via each production well about 1 to 200 barrels of an aqueous solution of a plug-forming composition per vertical foot of the high permeability zone to be treated per well treated.

2. The process defined in claim 1 wherein the aqueous solution of a plug-forming composition is made up of two separate solutions each of which contains a plug-forming reactive material.

3. The process defined in claim 2 wherein a slug of about 1 to 10 barrels per vertical foot of high permeability zone to be treated of an inert spacer liquid is injected between the slugs of plug-forming reactive material.

4. The process defined in claim 1 wherein the plug-forming composition is a water-soluble polymer composition.

5. The process defined in claim 1 wherein the plug-forming composition is a water-soluble alkali metal silicate composition.

6. The process defined in claim 1 wherein a plug is subsequently formed in any well in which communication with a high permeability zone develops during the carrying out of the enhanced oil recovery process.

7. The process defined in claim 1 wherein the plugging material injected via any one of the injection wells or production wells does not extend closer than about 100 feet to any other well which is in communication with the high permeability zone.

8. In the process of carrying out an enhanced oil recovery process in a subterranean oil-bearing reservoir of heterogeneous permeability having a high permeability zone wherein a drive fluid is injected into said reservoir via one or more injection wells and oil and/or gas is produced via one or more production wells, the improvement which comprises forming a plug in the reservoir adjacent substantially all injection wells and substantially all production wells involved in the enhanced oil recovery process, the plug formed occupying about 1 to 20 percent by volume of the high permeability zone, by injecting into the reservoir via each injection well and via each production well about 1 to 200 barrels of an aqueous solution of a plug-forming composition per vertical foot of the high permeability zone to be treated per well treated.

9. The process defined in claim 8 wherein the aqueous solution of a plug-forming composition is made up of two separate solutions each of which contains a plug-forming reactive material.

10. The process defined in claim 9 wherein a slug of about 1 to 10 barrels per vertical foot of high permeability zone to be treated of an inert spacer liquid is injected between the slugs of plug-forming reactive material.

11. The process defined in claim 8 wherein the plug-forming composition is a water-soluble polymer composition.

12. The process defined in claim 8 wherein the plug-forming composition is a water-soluble alkali metal silicate composition.

13. The process defined in claim 8 wherein the plugging material injected via any one of the injection wells or production wells does not extend closer than about 100 feet to any other well involved in the enhanced oil recovery process.

* * * * *